US012747673B2

(12) United States Patent
Lavine et al.

(10) Patent No.: US 12,747,673 B2

(45) Date of Patent: Sep. 29, 2026

(54) CLEARANCE CONTROL SYSTEM FOR BLADE OUTER AIR SEAL

(71) Applicant: RTX Corporation, Farmington, CT (US)

(72) Inventors: Griffin D. Lavine, South Glastonbury, CT (US); Davis Hovey, Jupiter, FL (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/794,338

(22) Filed: Aug. 5, 2024

(65) Prior Publication Data

US 2026/0036060 A1 Feb. 5, 2026

(51) Int. Cl.

*F01D 11/08* (2006.01)
*F01D 11/00* (2006.01)
*F01D 11/14* (2006.01)
*F01D 25/24* (2006.01)

(52) U.S. Cl.

CPC .......... *F01D 11/005* (2013.01); *F01D 25/246* (2013.01); *F05D 2240/55* (2013.01)

(58) Field of Classification Search

CPC .......... F01D 11/08; F01D 11/14; F01D 11/16; F01D 11/18; F01D 11/20; F01D 11/22; F01D 11/24; F01D 25/24; F01D 25/243; F01D 25/246; F05D 2240/11

See application file for complete search history.

(56) References Cited

U.S. PATENT DOCUMENTS

| | | | | |
|---|---|---|---|---|
| 4,759,687 | A | 7/1988 | Miraucourt | |
| 8,790,067 | B2 | 7/2014 | Mccaffrey | |
| 9,869,195 | B2 * | 1/2018 | Miller | F01D 11/14 |
| 9,885,247 | B2 * | 2/2018 | Miller | F01D 25/246 |
| 9,976,435 | B2 * | 5/2018 | Borja | F01D 5/02 |
| 11,391,173 | B2 * | 7/2022 | Mondal | F01D 11/025 |
| 2014/0186152 | A1 * | 7/2014 | McCaffrey | F01D 11/18 277/543 |
| 2016/0341061 | A1 | 11/2016 | Miller | |
| 2018/0202307 | A1 | 7/2018 | Ortiz | |
| 2019/0136707 | A1 | 5/2019 | Palmer | |
| 2020/0011203 | A1 * | 1/2020 | Prabhakar | F01D 25/005 |

OTHER PUBLICATIONS

EP Search Report for EP Patent Application No. 25194160.5 dated Dec. 9, 2025.

* cited by examiner

*Primary Examiner* — Nathaniel E Wiehe
*Assistant Examiner* — Maxime M Adjagbe
(74) *Attorney, Agent, or Firm* — Getz Balich LLC

(57) ABSTRACT

An assembly is provided for a turbine engine. This assembly includes a carrier, a control ring and a blade outer air seal mounted to the carrier. The carrier extends circumferentially around an axis. The carrier includes a cavity, a first section and a second section. The cavity is formed within the carrier by the first section and the second section. The first section is attached to the second section at a full-hoop inner seal interface located radially inboard of the cavity. The first section axially overlaps the second section at the full-hoop inner seal interface. The first section is further attached to the second section at a full-hoop outer seal interface located radially outboard of the cavity. The control ring extends circumferentially around the axis within the cavity.

19 Claims, 5 Drawing Sheets

CLEARANCE CONTROL SYSTEM FOR BLADE OUTER AIR SEAL

BACKGROUND OF THE DISCLOSURE

1. Technical Field

This disclosure relates generally to a turbine engine and, more particularly, to a clearance control system for a blade outer air seal.

2. Background Information

A turbine engine may include a clearance control system for tailoring clearance between rotor blade tips and a blade outer air seal. Various types and configurations of clearance control systems are known in the art. While these known clearance control systems have various benefits, there is still room in the art for improvement.

SUMMARY OF THE DISCLOSURE

According to an aspect of the present disclosure, an assembly is provided for a turbine engine. This assembly includes a carrier, a control ring and a blade outer air seal mounted to the carrier. The carrier extends circumferentially around an axis. The carrier includes a cavity, a first section and a second section. The cavity is formed within the carrier by the first section and the second section. The first section is attached to the second section at a full-hoop inner seal interface located radially inboard of the cavity. The first section axially overlaps the second section at the full-hoop inner seal interface. The first section is further attached to the second section at a full-hoop outer seal interface located radially outboard of the cavity. The control ring extends circumferentially around the axis within the cavity.

According to another aspect of the present disclosure, another assembly is provided for a turbine engine. This assembly includes a carrier, a control ring and a blade outer air seal mounted to the carrier. The carrier extends circumferentially around an axis. The carrier includes a cavity, a first section and a second section. The cavity is formed within the carrier by the first section and the second section. The first section is coupled to the second section at an axial lap joint located radially inboard of the cavity. The axial lap joint extends uninterrupted circumferentially around the axis. The first section is further coupled to the second section at an outer joint located radially outboard of the cavity. The control ring extends circumferentially around the axis within the cavity.

According to still another aspect of the present disclosure, another assembly is provided for a turbine engine. This assembly includes a carrier, a control ring and a blade outer air seal. The carrier extends circumferentially around an axis. The carrier includes a cavity, a first section and a second section. The cavity is formed within the carrier by the first section and the second section. The first section is coupled to the second section at an inner joint located radially inboard of the cavity. The first section extends axially along the second section at the inner joint. The first section is further coupled to the second section at an outer joint located radially outboard of the cavity. The first section extends axially along the second section at the outer joint. The control ring extends circumferentially around the axis within the cavity. The blade outer air seal is mounted to each of the first section and the second section.

The outer joint may extend uninterrupted circumferentially around the axis.

The blade outer air seal may be mounted to each of the first section and the second section.

The carrier may fluidly separate the cavity from a plenum next to and/or around the carrier.

The full-hoop inner seal interface may be configured as or otherwise include a lap joint between the first section and the second section.

The full-hoop inner seal interface may be configured as or otherwise include an interference fit connection between the first section and the second section.

The second section may axially overlap the first section at the full-hoop outer seal interface.

The full-hoop outer seal interface may be configured as or otherwise include an interference fit connection between the first section and the second section.

The first section and the second section may each have a channeled sectional geometry.

The first section may include a first inner flange, a first outer flange and a first web extending radially between and connected to the first inner flange and the first outer flange. The first inner flange may be attached to the second section at the full-hoop inner seal interface. The first outer flange may be attached to the second section at the full-hoop outer seal interface. The cavity may extend axially within the carrier to the first web. The cavity may extend radially within the carrier from the first inner flange to the first outer flange.

The second section may include a second inner flange, a second outer flange and a second web extending radially between and connected to the second inner flange and the second outer flange. The second inner flange may be attached to the first inner flange at the full-hoop inner seal interface. The second outer flange may be attached to the first outer flange at the full-hoop outer seal interface. The cavity may extend axially within the carrier from the second web to the first web.

The cavity may also extend radially within the carrier from the second inner flange to the first outer flange.

An axial distal end of the first outer flange may be axially adjacent the second web.

The second outer flange may be radially outboard of and axially overlap the first outer flange at an axial distal end of the first outer flange.

The blade outer air seal may be mounted to the first section.

The blade outer air seal may also be mounted to the second section.

The blade outer air seal may be mounted to the second section.

The first section and the second section may each have a full-hoop monolithic body.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
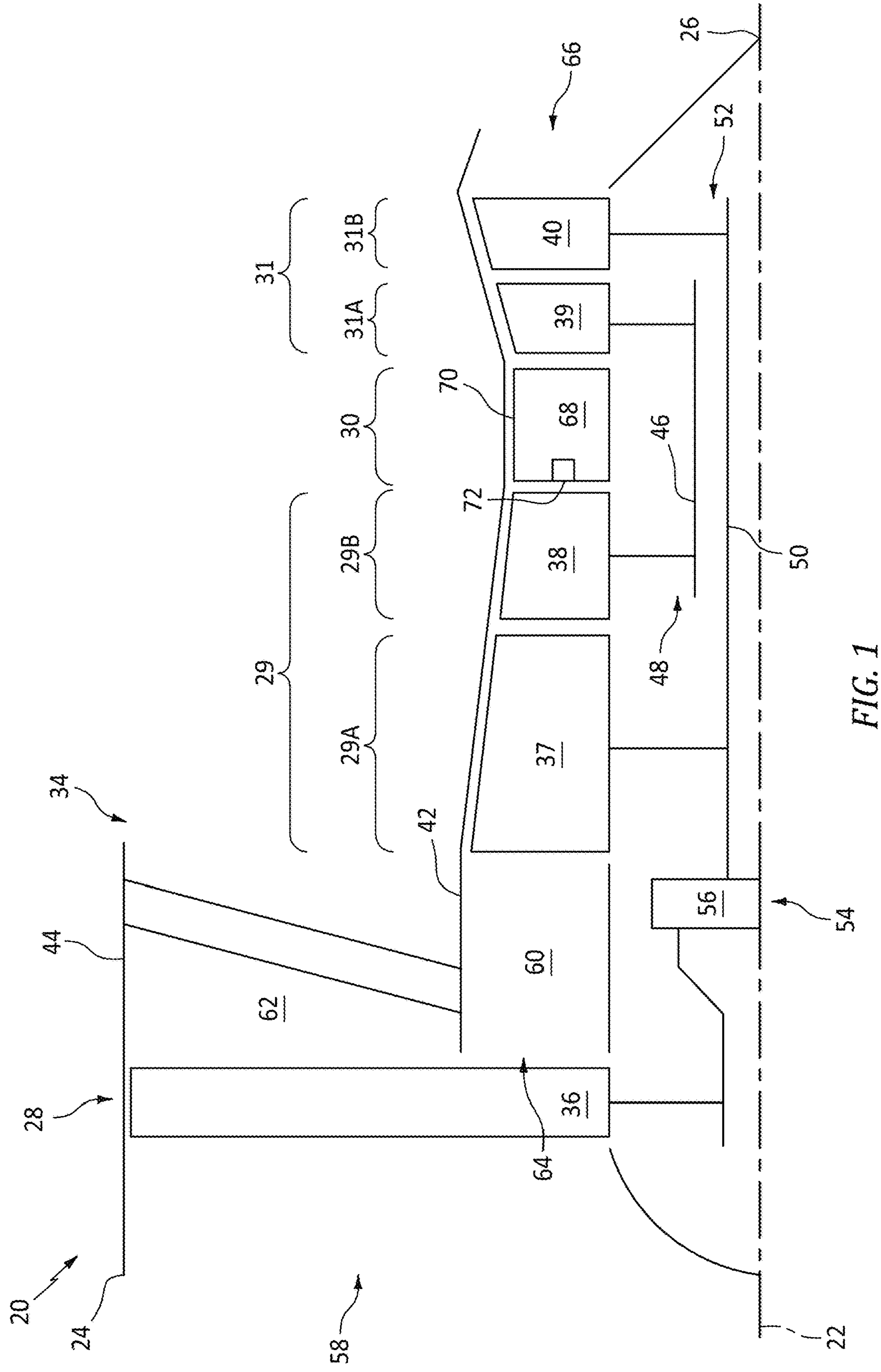
FIG. 1 is a partial schematic sectional illustration of a turbine engine for an aircraft propulsion system.

FIG. 1 illustrates a turbine engine 20 for a propulsion system of an aircraft. The aircraft may be an airplane, a drone (e.g., an unmanned aerial vehicle (UAV)), or any other manned or unmanned aerial vehicle or system. For ease of description, the aircraft propulsion system is described below as a turbofan propulsion system, and the turbine engine 20 is described below as a turbofan engine. The present disclosure, however, is not limited to such an exemplary aircraft propulsion system. The aircraft propulsion system, for example, may alternatively be configured as a turbojet propulsion system, a turboprop propulsion system, a turboshaft propulsion system or an open rotor propulsion system. Moreover, the present disclosure is not limited to propulsion system applications. The turbine engine 20, for example, may alternatively be configured as or included as part of an auxiliary power unit (APU) for the aircraft or a ground-based (e.g., industrial) electrical power system.

The turbine engine 20 of FIG. 1 extends axially along an axis 22 between a forward, upstream end 24 of the turbine engine 20 and an aft, downstream end 26 of the turbine engine 20. Briefly, the axis 22 may be a centerline axis of the turbine engine 20 and/or one or more of its members. The axis 22 may also or alternatively be a rotational axis for one or more members of the turbine engine 20. The turbine engine 20 of FIG. 1 includes a propulsor section 28 (e.g., a fan section), a compressor section 29, a combustor section 30 and a turbine section 31. The compressor section 29 of FIG. 1 includes a low pressure compressor (LPC) section 29A and a high pressure compressor (HPC) section 29B. The turbine section 31 of FIG. 1 includes a high pressure turbine (HPT) section 31A and a low pressure turbine (LPT) section 31B.

The engine sections 28-31B may be arranged sequentially along the axis 22 within a stationary engine housing 34. The propulsor section 28 includes a bladed propulsor rotor 36; e.g., a fan rotor. The LPC section 29A includes a bladed low pressure compressor (LPC) rotor 37. The HPC section 29B includes a bladed high pressure compressor (HPC) rotor 38. The HPT section 31A includes a bladed high pressure turbine (HPT) rotor 39. The LPT section 31B includes a bladed low pressure turbine (LPT) rotor 40. These engine rotors 36-40 are housed within the engine housing 34. The engine housing 34 of FIG. 1, for example, includes an inner housing structure 42 (e.g., a core case structure) and an outer housing structure 44 (e.g., a propulsor case structure). The inner housing structure 42 may house one or more of the engine sections 29A-31B and their engine rotors 37-40. The outer housing structure 44 may house at least the propulsor section 28 and its propulsor rotor 36.

The HPC rotor 38 is coupled to and rotatable with the HPT rotor 39. The HPC rotor 38 of FIG. 1, for example, is connected to the HPT rotor 39 through a high speed shaft 46. At least (or only) the HPC rotor 38, the HPT rotor 39 and the high speed shaft 46 collectively form a high speed rotating assembly 48; e.g., a high speed spool of a core of the turbine engine 20. This high speed rotating assembly 48 of FIG. 1 and its members 38, 39 and 46 are rotatable about the axis 22.

The LPC rotor 37 is coupled to and rotatable with the LPT rotor 40. The LPC rotor 37 of FIG. 1, for example, is connected to the LPT rotor 40 through a low speed shaft 50. At least (or only) the LPC rotor 37, the LPT rotor 40 and the low speed shaft 50 collectively form a low speed rotating assembly 52; e.g., a low speed spool of the engine core. This low speed rotating assembly 52 is further coupled to the propulsor rotor 36 through a drivetrain 54. This drivetrain 54 may be configured as a geared drivetrain, where a geartrain 56 (e.g., a transmission, a speed change device, an epicyclic geartrain, etc.) is disposed between and operatively couples the propulsor rotor 36 to the low speed rotating assembly 52 and its LPT rotor 40. With this arrangement, the propulsor rotor 36 may rotate at a different (e.g., slower) rotational velocity than the low speed rotating assembly 52 and its LPT rotor 40. However, the drivetrain 54 may alternatively be configured as a direct drive drivetrain, where the geartrain 56 is omitted. With such an arrangement, the propulsor rotor 36 rotates at a common (the same) rotational velocity as the low speed rotating assembly 52 and its LPT rotor 40. The low speed rotating assembly 52 of FIG. 1 and its members 37, 40 and 50 as well as the propulsor rotor 36 are rotatable about the axis 22.

During operation, ambient air from outside of the aircraft enters the turbine engine 20 through an airflow inlet 58. This air is directed across the propulsor section 28 and into a (e.g., annular) core flowpath 60 and a (e.g., annular) bypass flowpath 62. The core flowpath 60 of FIG. 1 extends sequentially through the LPC section 29A, the HPC section 29B, the combustor section 30, the HPT section 31A and the LPT section 31B from an airflow inlet 64 into the core flowpath 60 to a combustion products exhaust 66 out from the core flowpath 60 and the engine core. The air entering the core flowpath 60 may be referred to as "core air". The bypass flowpath 62 extends through a bypass duct, which bypasses (e.g., is disposed radially outboard of and extends along) the engine core. The air within the bypass flowpath 62 may be referred to as "bypass air".

The core air is compressed by the LPC rotor 37 and the HPC rotor 38 and is directed into a (e.g., annular) combustion chamber 68 of a (e.g., annular) combustor 70 in the combustor section 30. Fuel is injected into the combustion chamber 68 by one or more fuel injectors 72 and mixed with the compressed core air to provide a fuel-air mixture. This fuel-air mixture is ignited and combustion products thereof flow through and sequentially drive rotation of the HPT rotor 39 and the LPT rotor 40 about the axis 22. The rotation of the HPT rotor 39 and the LPT rotor 40 respectively drive rotation of the HPC rotor 38 and the LPC rotor 37 about the axis 22 and, thus, the HPC rotor 38 and the LPC rotor 37 drive compression of the air received from the core inlet 64. The rotation of the LPT rotor 40 also drives rotation of the propulsor rotor 36. The rotation of the propulsor rotor 36 propels the bypass air through and out of the bypass flowpath 62. The propulsion of the bypass air may account for a majority of thrust generated by the turbine engine 20 of FIG. 1, e.g., more than seventy-five percent (75%) of engine thrust. The turbine engine 20 of the present disclosure, however, is not limited to the foregoing exemplary thrust ratio.

Figure 2:
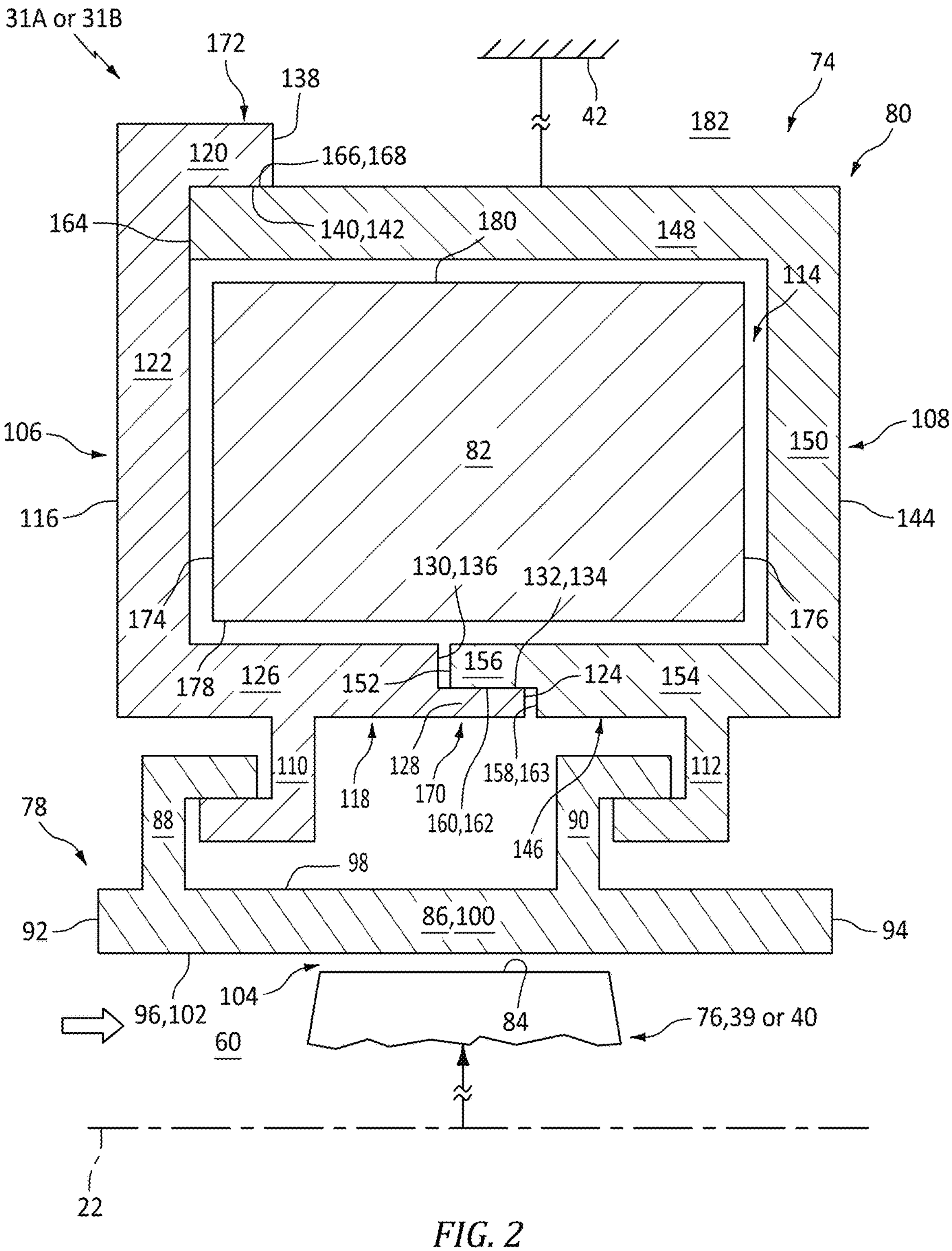
FIG. 2 is a partial schematic sectional illustration of a clearance control system arranged with an engine rotor.

FIG. 2 illustrates a clearance control system 74 arranged with an engine rotor 76, where the clearance control system 74 and the engine rotor 76 are housed within the inner housing structure 42. For ease of description, the clearance control system 74 and the engine rotor 76 are described below as being located along the core flowpath 60 within the turbine section 31. The engine rotor 76, for example, may be configured as or otherwise included as part of the HPT rotor 39. In another example, the engine rotor 76 may be configured as or otherwise included as part of the LPT rotor 40. The present disclosure, however, is not limited to such exemplary arrangements within the turbine section 31. The clearance control system 74 of FIG. 2 includes a blade outer air seal 78 ("BOAS"; sometimes also referred to as an "outer shroud"), a control ring carrier 80 and a control ring 82. Note, for ease of description, the clearance control system 74 and its members 78, 80 and 82 are described below as being coaxial with the axis 22. In other words, the axis 22 may also be a centerline axis of the clearance control system 74 and its members 78, 80 and 82. However, it is contemplated any one or more of the members 78, 80 and/or 82 may alternatively have a centerline axis that is (e.g., slightly) laterally offset from the axis 22. A centerline axis of the members 78, 80 and 82, for example, may be offset radially to one side of the axis 22; however, this centerline axis may still be parallel with the axis 22.

The blade outer air seal 78 is configured to form a radial outer peripheral boundary of the core flowpath 60. The blade outer air seal 78 is also arranged in close proximity to rotor blade tips 84 of the engine rotor 76 to reduce leakage over the rotor blade tips 84 during turbine engine operation. The blade outer air seal 78 of FIG. 2 includes a tubular seal base 86, one or more seal upstream mounts 88 and one or more seal downstream mounts 90.

Figure 3:
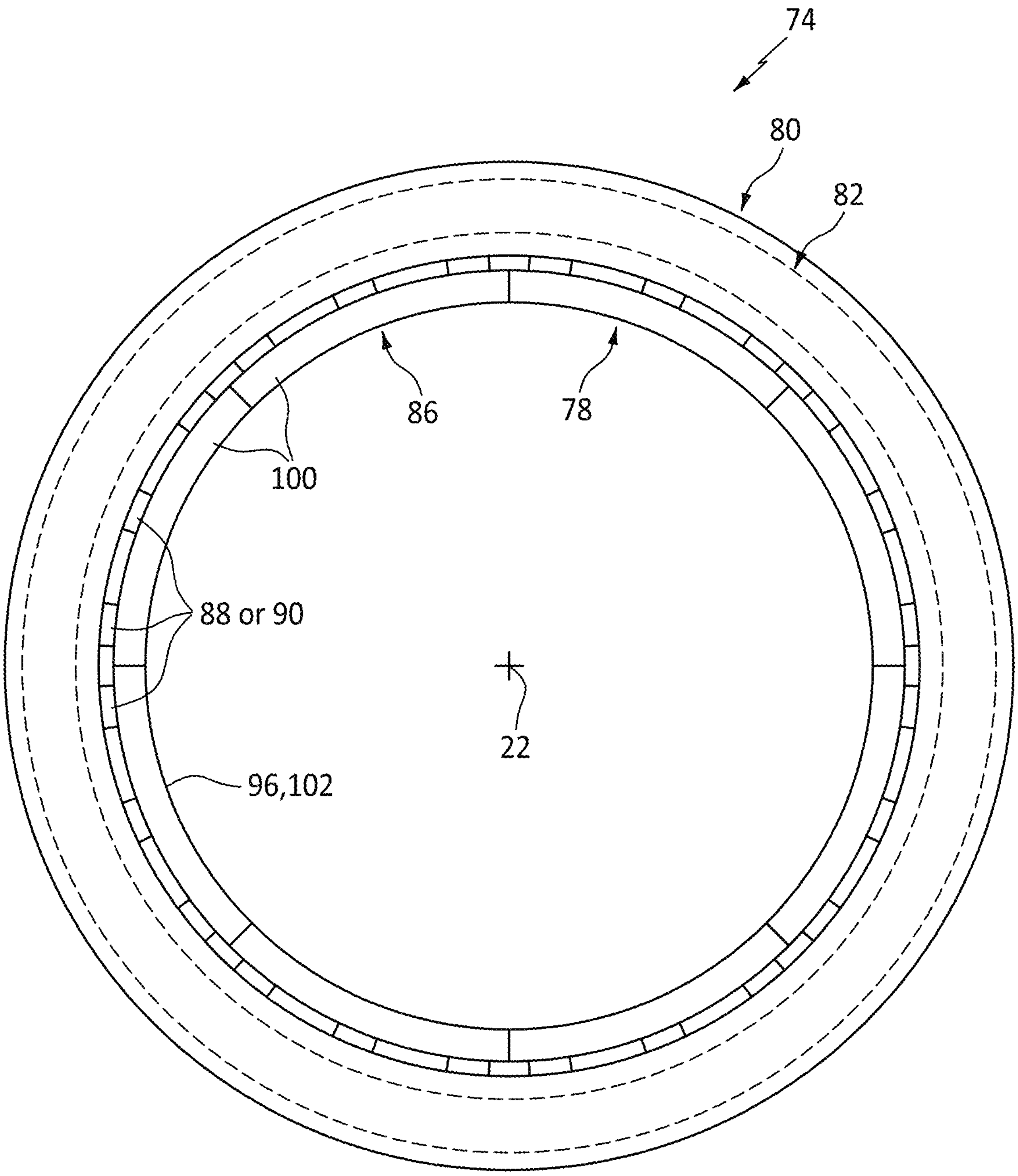
FIG. 3 is a schematic end view illustration of the clearance control system.

The blade outer air seal 78 and its seal base 86 extend axially along the axis 22/longitudinally along the core flowpath 60 from an upstream end 92 of the blade outer air seal 78 to a downstream end 94 of the blade outer air seal 78. The seal base 86 extends radially from a radial inner side 96 of the blade outer air seal 78 and its seal base 86 to a radial outer side 98 of the seal base 86. Referring to FIG. 3, the blade outer air seal 78 and its seal base 86 extend circumferentially around the axis 22, providing the blade outer air seal 78 and its seal base 86 with a tubular geometry. As best seen in FIG. 3, the seal base 86 and, thus, the blade outer air seal 78 are circumferentially segmented bodies. The seal base 86 of FIG. 3, for example, includes a plurality of base segments 100 arranged circumferentially about the axis 22 end-to-end in an annular array; e.g., a circular array.

The seal base 86 includes a tubular (e.g., cylindrical or frustoconical) flowpath surface 102 at the seal inner side 96. This flowpath surface 102 is formed collectively by the base segments 100 and extends circumferentially around the axis 22. Referring to FIG. 2, the flowpath surface 102 extends axially along the axis 22/longitudinally along the core flowpath 60 from (or about) the seal upstream end 92 to (or about) the seal downstream end 94. The flowpath surface 102 is disposed next to and radially outboard of the engine rotor 76 and its rotor blade tips 84. The flowpath surface 102 thereby extends axially along and circumscribes the engine rotor 76 and its rotor blade tips 84. With this arrangement, the flowpath surface 102 forms the radial outer peripheral boundary of the core flowpath 60 along the blade outer air seal 78. While the flowpath surface 102 of FIG. 2 is radially spaced outward from the engine rotor 76 and its rotor blade tips 84 by a (e.g., slight) radial air gap 104, a radial height of this gap 104 may be minimized by operation of the clearance control system 74 and its members 80 and 82 as described below in further detail.

The seal upstream mounts 88 may be arranged circumferentially about the axis 22 in an annular array, where each base segment 100 may be associated with one or more of the seal upstream mounts 88. Each seal upstream mount 88 is connected to (e.g., formed integral with or otherwise attached to) the respective base segment 100. Each seal upstream mount 88 is disposed at (e.g., on, adjacent or proximate) or near the seal upstream end 92. Each seal upstream mount 88 may be configured as an upstream hook. Here, the upstream hook is facing downstream. However, in other embodiments, the upstream hook may alternatively face upstream.

The seal downstream mounts 90 may be arranged circumferentially about the axis 22 in an annular array, where each base segment 100 may be associated with one or more of the seal downstream mounts 90. Each seal downstream mount 90 is connected to the respective base segment 100. Each seal downstream mount 90 is disposed axially between a respective one of the seal upstream mounts 88 and the seal downstream end 94. Each seal downstream mount 90 may be configured as a downstream hook. Here, the downstream hook is facing downstream. However, in other embodiments, the downstream hook may alternatively face upstream.

The ring carrier 80 includes a carrier upstream section 106, a carrier downstream section 108, one or more (e.g., arcuate) carrier upstream mounts 110 and one or more (e.g., arcuate) carrier downstream mounts 112. The ring carrier 80 also includes an internal carrier cavity 114 (e.g., a sealed cavity) within the ring carrier 80 and formed (e.g., only or substantially) by the carrier upstream section 106 and the carrier downstream section 108.

The carrier upstream section 106 is disposed at an axial upstream end 116 of the ring carrier 80. The carrier upstream section 106 of FIG. 2 has a channeled sectional geometry when viewed, for example, in a reference plane parallel to (e.g., including) the axis 22. The carrier upstream section 106 of FIG. 2, for example, includes an upstream section inner flange 118, an upstream section outer flange 120 and an upstream section web 122. The carrier upstream section 106 and each of its members 118, 120 and 122 extends circumferentially uninterrupted around the axis 22, providing the carrier upstream section 106 and each of its members 118, 120 and 122 with a full-hoop geometry. For example, each of the upstream section flanges 118, 120 may have a tubular geometry and the upstream section web 122 may have an annular geometry.

The upstream section inner flange 118 projects axially along the axis 22 from the carrier upstream end 116 to an axial distal end 124 of the upstream section inner flange 118. This upstream section inner flange 118 includes a tubular upstream section flange base 126 and a tubular upstream section flange rim 128. The upstream section flange rim 128 is connected to the upstream section flange base 126. The upstream section flange rim 128 projects axially out from an axial distal end 130 of the upstream section flange base 126 to the distal end 124 of the upstream section inner flange 118. The upstream section flange rim 128 of FIG. 2 includes an upstream section engagement surface 132 at a radial outer side 134 of the upstream section flange rim 128. This upstream section engagement surface 132 extends axially from an annular shoulder 136 at the distal end 130 of the upstream section flange base 126 to the distal end 124 of the upstream section inner flange 118. The upstream section engagement surface 132 extends circumferentially uninterrupted around the axis 22, providing the upstream section engagement surface 132 with a full-hoop (e.g., cylindrical)

geometry. Of course, other features (e.g., milled pockets, holes, etc.) proximate the engagement surface 132 may not have full-hoop geometries. Here, the upstream section engagement surface 132 is contiguous with and radially inboard of the upstream section flange shoulder 136.

The upstream section outer flange 120 is spaced radially outboard from the upstream section inner flange 118. The upstream section outer flange 120 projects axially along the axis 22 from the carrier upstream end 116 to an axial distal end 138 of the upstream section outer flange 120. The upstream section outer flange 120 thereby (e.g., partially) axially overlaps the upstream section inner flange 118 and its upstream section flange base 126. Here, the distal end 138 of the upstream section outer flange 120 is axially recessed from the distal end 124 of the upstream section inner flange 118, as well as the distal end 130. The upstream section outer flange 120 of FIG. 2 includes an upstream section engagement surface 140 at a radial inner side 142 of the upstream section outer flange 120. This upstream section engagement surface 140 extends axially from the upstream section web 122 to the distal end 138 of the upstream section outer flange 120. The upstream section engagement surface 140 extends circumferentially uninterrupted around the axis 22, providing the upstream section engagement surface 140 with a full-hoop (e.g., cylindrical) geometry.

The upstream section web 122 is disposed at the carrier upstream end 116. The upstream section web 122 extends radially between and is connected to (a) the upstream section inner flange 118 and its upstream section flange base 126 and (b) the upstream section outer flange 120.

The carrier downstream section 108 is disposed at an axial downstream end 144 of the ring carrier 80, where the carrier downstream end 144 is axially opposite the carrier upstream end 116. The carrier downstream section 108 of FIG. 2 has a channeled sectional geometry when viewed, for example, in the reference plane. The carrier downstream section 108 of FIG. 2, for example, includes a downstream section inner flange 146, a downstream section outer flange 148 and a downstream section web 150. The carrier downstream section 108 and each of its members 146, 148 and 150 extends circumferentially uninterrupted around the axis 22, providing the carrier downstream section 108 and each of its members 146, 148 and 150 with a full-hoop geometry. For example, each of the downstream section flanges 146 and 148 may have a tubular geometry and the downstream section web 150 may have an annular geometry.

The downstream section inner flange 146 projects axially along the axis 22 from the carrier downstream end 144 to an axial distal end 152 of the downstream section inner flange 146. This downstream section inner flange 146 includes a tubular downstream section flange base 154 and a tubular downstream section flange rim 156. The downstream section flange rim 156 is connected to the downstream section flange base 154. The downstream section flange rim 156 projects axially out from an axial distal end 158 of the downstream section flange base 154 to the distal end 152 of the downstream section inner flange 146. The downstream section flange rim 156 of FIG. 2 includes a downstream section engagement surface 160 at a radial inner side 162 of the downstream section flange rim 156. This downstream section engagement surface 160 extends axially from an annular shoulder 163 at the distal end 158 of the downstream section flange base 154 to the distal end 152 of the downstream section inner flange 146. The downstream section engagement surface 160 extends circumferentially uninterrupted around the axis 22, providing the downstream section engagement surface 160 with a full-hoop (e.g., cylindrical) geometry. Here, the downstream section engagement surface 160 is contiguous with and radially outboard of the downstream section flange shoulder 163.

The downstream section outer flange 148 is spaced radially outboard from the downstream section inner flange 146. The downstream section outer flange 148 projects axially along the axis 22 from the carrier downstream end 144 to an axial distal end 164 of the downstream section outer flange 148. The downstream section outer flange 148 thereby axially overlaps (e.g., an entirety of) the downstream section inner flange 146. Here, the distal end 152 of the downstream section inner flange 146 is axially recessed from the distal end 164 of the downstream section outer flange 148. The downstream section outer flange 148 of FIG. 2 includes a downstream section engagement surface 166 at a radial outer side 168 of the downstream section outer flange 148. This downstream section engagement surface 166 extends axially to the distal end 164 of the downstream section outer flange 148. The downstream section engagement surface 166 extends circumferentially uninterrupted around the axis 22, providing the downstream section engagement surface 166 with a full-hoop (e.g., cylindrical) geometry.

The downstream section web 150 is disposed at the carrier downstream end 144. The downstream section web 150 extends radially between and is connected to (a) the downstream section inner flange 146 and its downstream section flange base 154 and (b) the downstream section outer flange 148.

The carrier downstream section 108 is mated with the carrier upstream section 106. The downstream section inner flange 146 of FIG. 2, for example, is coupled to the upstream section inner flange 118 at an inner coupling 170 located radially inboard of the carrier cavity 114. This inner coupling 170 may be configured as a full-hoop inner seal interface between the carrier downstream section 108 and the carrier upstream section 106. For example, at the inner coupling 170, the downstream section flange rim 156 is arranged with the upstream section flange rim 128 to provide an axial lap joint between the downstream section inner flange 146 and the upstream section inner flange 118. Here, the downstream section engagement surface 160 axially overlaps and is radially outboard of the upstream section engagement surface 132. The downstream section engagement surface 160 may also (or alternately) radially engage (e.g., abut against, contact, etc.) the upstream section engagement surface 132 to provide a (e.g., slight) interference fit connection between the downstream section inner flange 146 and the upstream section inner flange 118. The inner coupling 170 may thereby be sealed such that little or no fluid may leak across the inner coupling 170 between the downstream section inner flange 146 and the upstream section inner flange 118.

The downstream section outer flange 148 of FIG. 2 is coupled to the upstream section outer flange 120 at an outer coupling 172 located radially outboard of the carrier cavity 114. This outer coupling 172 may be configured as a full-hoop outer seal interface between the carrier downstream section 108 and the carrier upstream section 106. For example, at the outer coupling 172, the downstream section outer flange 148 is arranged with the upstream section outer flange 120 to provide an axial overlap joint between the downstream section outer flange 148 and the upstream section outer flange 120. Here, the upstream section engagement surface 140 axially overlaps and is radially outboard of the downstream section engagement surface 166. The upstream section engagement surface 140 may also (or alternately) radially engage the downstream section engagement surface 166 to provide a (e.g., slight) interference fit connection between the upstream section outer flange 120 and the downstream section outer flange 148. The outer coupling 172 may thereby be sealed such that little or no fluid may leak across the outer coupling 172 between the downstream section outer flange 148 and the upstream section outer flange 120. Here, the distal end 164 of the downstream section outer flange 148 may also axially engage the upstream section web 122.

The carrier cavity 114 extends axially within the ring carrier 80 between and is formed by the upstream section web 122 and the downstream section web 150. A first portion of the carrier cavity 114 extends radially within the ring carrier 80 between and is formed by (a) the upstream section inner flange 118 and its upstream section flange base 126 and (b) a portion of the downstream section outer flange 148 adjacent the upstream section web 122. A second portion of the carrier cavity 114 extends radially within the ring carrier 80 between and is formed by (a) the downstream section inner flange 146 and its members 154 and 156 and (b) a portion of the downstream section outer flange 148 adjacent the downstream section web 150. The carrier cavity 114 extends within the ring carrier 80 circumferentially around the axis 22, providing the carrier cavity 114 with a full-hoop (e.g., annular) geometry.

The carrier upstream mounts 110 may be arranged circumferentially about the axis 22 in an annular array. Each carrier upstream mount 110 of FIG. 2 is connected to the carrier upstream section 106 and its upstream section inner flange 118. Each carrier upstream mount 110 may be configured as an upstream hook. Here, the upstream hook is facing upstream. However, in other embodiments, the upstream hook may alternatively face downstream. Each carrier upstream mount 110 is mated with a respective one of the seal upstream mounts 88. The carrier upstream mounts 110 and the seal upstream mounts 88 thereby attach the blade outer air seal 78 and its base segments 100 to the ring carrier 80 and its carrier upstream section 106, for example, independent of the carrier downstream section 108.

The carrier downstream mounts 112 may be arranged circumferentially about the axis 22 in an annular array. Each carrier downstream mount 112 of FIG. 2 is connected to the carrier downstream section 108 and its downstream section inner flange 146. Each carrier downstream mount 112 may be configured as a downstream hook. Here, the downstream hook is facing upstream. However, in other embodiments, the downstream hook may alternatively face downstream. Each carrier downstream mount 112 is mated with a respective one of the seal downstream mounts 90. The carrier downstream mounts 112 and the seal downstream mounts 90 thereby attach the blade outer air seal 78 and its base segments 100 to the ring carrier 80 and its carrier downstream section 108, for example, independent of the carrier upstream section 106.

The ring carrier 80 may mount the blade outer air seal 78 and its base segments 100 to the inner housing structure 42. The carrier downstream section 108 (or the carrier upstream section 106), for example, may be attached to the inner housing structure 42.

The control ring 82 extends axially along the axis 22 between opposing axial ends 174 and 176 of the control ring 82. The control ring 82 extends radially from a radial inner side 178 of the control ring 82 to a radial outer side 180 of the control ring 82. The control ring 82 is disposed within the carrier cavity 114. The control ring 82 extends within the carrier cavity 114 circumferentially around the axis 22, providing the control ring 82 with a full-hoop (e.g., annular) geometry. Note, it is contemplated that the control ring 82 may include one or more non-axisymmetric features and/or interfaces without compromising its full-hoop geometry.

During turbine engine operation, air bled from the compressor section 29 (see FIG. 1) may be directed into a plenum 182 surrounding the ring carrier 80. A temperature of this bleed air influences thermal expansion and contraction of the ring carrier 80. A temperature of the combustion products flowing through the core flowpath 60 similarly influences thermal expansion and contraction of the engine rotor 76 and its rotor blades. However, whereas a disk of the engine rotor 76 has a relatively large mass and is relatively thick, the ring carrier 80 has a relatively small mass with relatively thin walls. The ring carrier 80 therefore may thermally expand faster than the engine rotor 76 during a rapid engine power increase. Similarly, the ring carrier 80 may thermally contract faster than the engine rotor 76 during a rapid engine power increase. This differential thermal expansion/contraction rate between the ring carrier 80 and the engine rotor 76 (if unmitigated) may increase leakage over the rotor blade tips 84 or increase likelihood of contact between the rotor blade tips 84 and the blade outer air seal 78. However, the control ring 82 is provided to control the outward and inward thermally induced movement of the blade outer air seal 78 and its base segments 100. The carrier cavity 114, for example, is substantially or completely fluidly discrete from the plenum 182 next to and surrounding the ring carrier 80. The control ring 82 therefore may be exposed to higher or lower temperatures at a slower rate than the ring carrier 80 during transient engine operation. Moreover, the relatively large mass of the control ring 82 decreases its thermal growth rate, which may be tuned to be similar to or the same as the thermal growth rate of the engine rotor 76. The control ring 82 therefore may radially engage the section inner flanges 118 and 146 and limit the outward movement of the blade outer air seal 78 and its base segments 100 during the rapid engine power increase. Similarly, the control ring 82 may radially engage the downstream section outer flange 148 and limit the inward movement of the blade outer air seal 78 and its base segments 100 during the rapid engine power decrease.

In some embodiments, referring to FIG. 2, the inner coupling 170 may be stepped. The upstream section inner flange 118 of FIG. 2, for example, is configured with its tubular upstream section flange rim 128 and its adjacent upstream section flange shoulder 136. Similarly, the downstream section inner flange 146 of FIG. 2 is configured with its tubular downstream section flange rim 156 and its adjacent downstream section flange shoulder 164. In other embodiments, referring to FIG. 4, the downstream section inner flange 146 and its downstream section flange base 154 may axially overlap and radially engage the upstream section inner flange 118 and its upstream section flange base 126.

Figure 5:
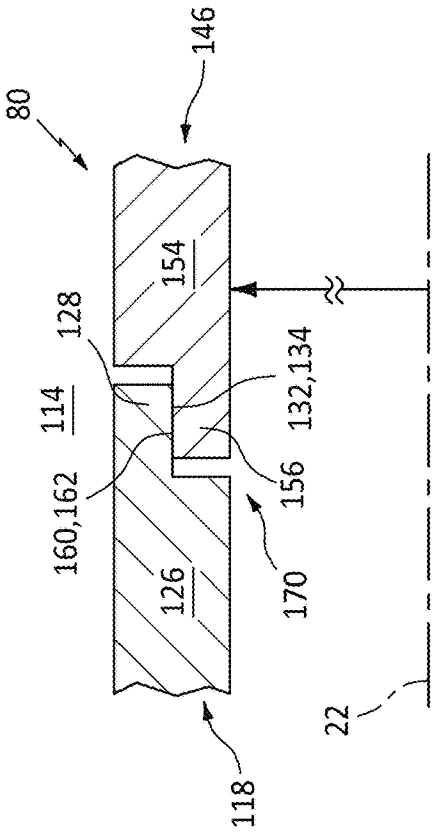
FIGS. 4-6 are partial schematic sectional illustrations of the control ring carrier with various alternative inner coupling arrangements.
Figure 4:
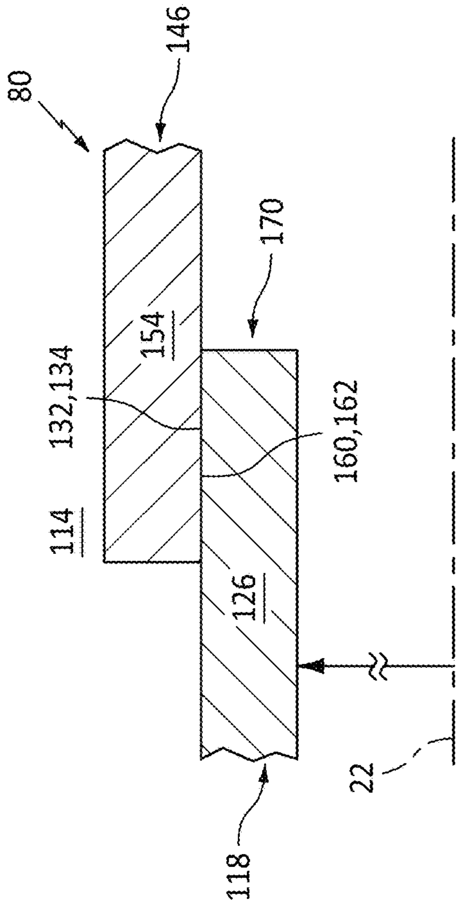
Figure 6:
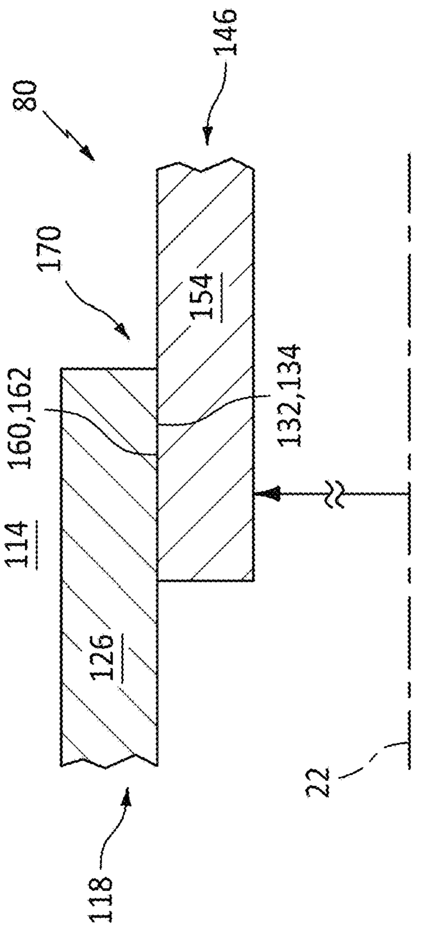

In some embodiments, referring to FIGS. 2 and 4, at least a portion of the downstream section inner flange 146 may be radially outboard of the upstream section inner flange 118 at the inner coupling 170. In other embodiments, referring to FIGS. 5 and 6, it is contemplated that these arrangements may be reversed such that the upstream section inner flange 118 is radially outboard of the downstream section inner flange 146 at the inner coupling 170.

Figure 7:
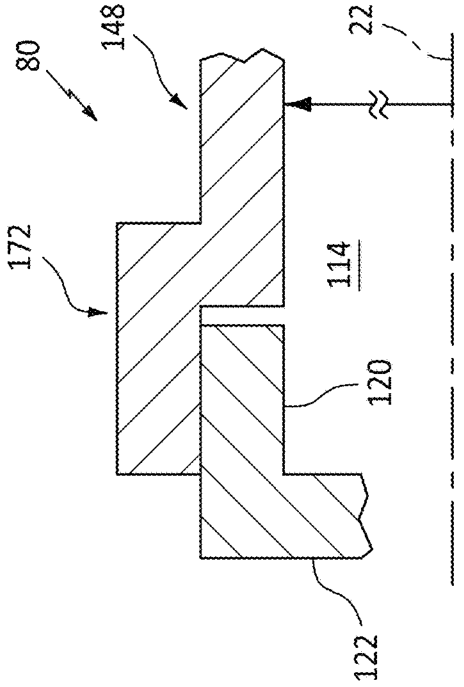
FIG. 7 is a partial schematic sectional illustration of the control ring carrier with another outer coupling arrangement.

In some embodiments, referring to FIG. 2, at least a portion of the upstream section outer flange 120 may be radially outboard of the downstream section outer flange 148 at the outer coupling 172. In other embodiments, referring to FIG. 7, it is contemplated that this arrangement may be reversed such that the downstream section outer flange 148 is radially outboard of the upstream section outer flange 120 at the outer coupling 172.

The inner coupling 170 of FIG. 2 is disposed axially between the carrier upstream mounts 110 and the carrier downstream mounts 112. The present disclosure, however, is not limited to such an exemplary arrangement. For example, referring to FIG. 8, the inner coupling 170 may alternatively be disposed axially upstream of the carrier upstream mounts 110. The carrier upstream mounts 110 may thereby be disposed axially between the inner coupling 170 and the carrier downstream mounts 112. Here, the inner coupling 170 may be configured as an axial overlap joint rather than, for example, the axial lap joint as shown in FIG. 2. In addition, the carrier upstream mounts 110 may be connected to the carrier downstream section 108 and its downstream section inner flange 146 rather than the carrier upstream section 106.

Figure 8:
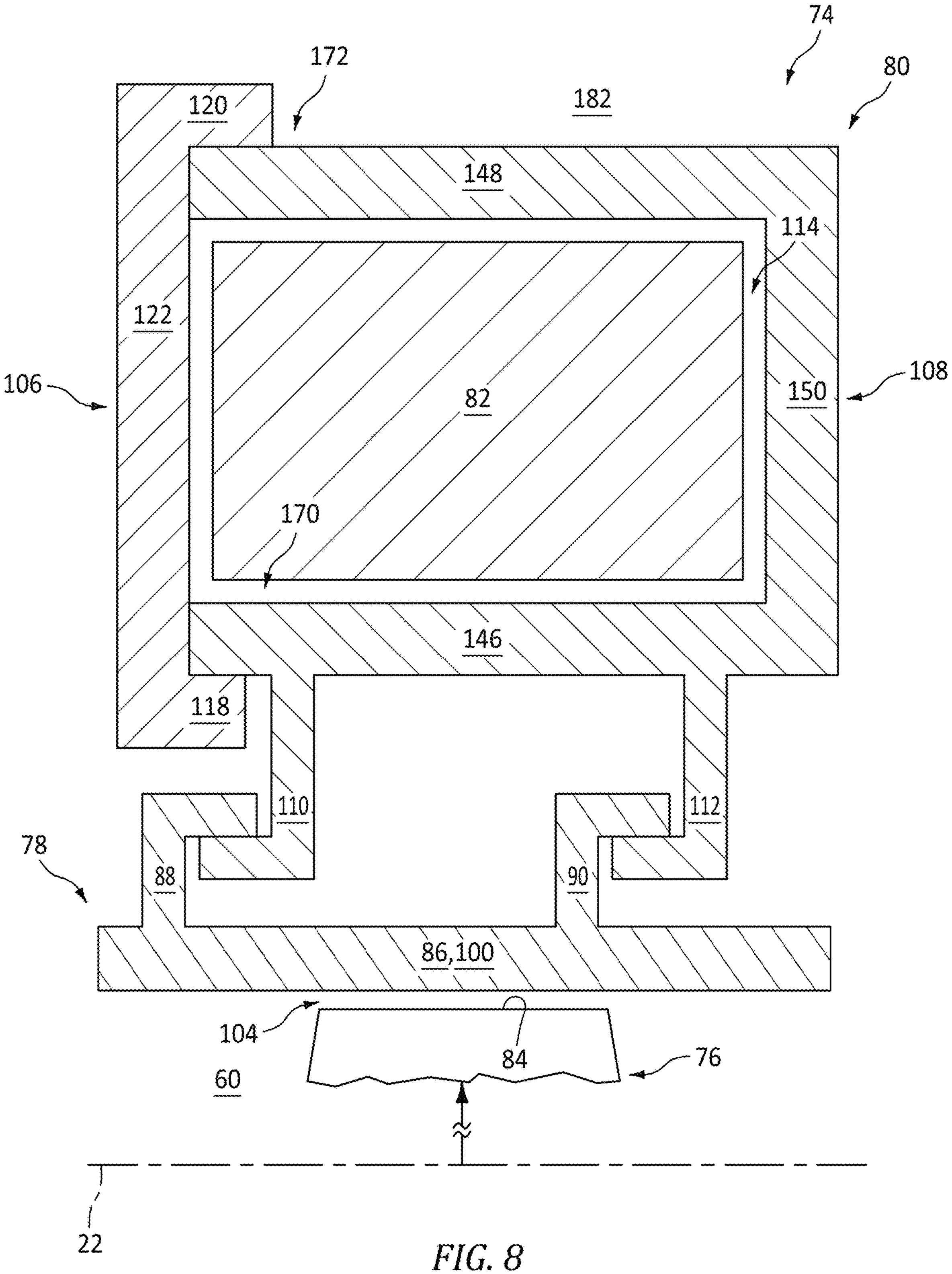
FIG. 8 is a partial schematic sectional illustration of another clearance control system arranged with the engine rotor.

Each of the clearance control system members 82, 106 and 108 of FIGS. 2 and 8 may be configured as or otherwise include a full-hoop monolithic body. Each clearance control system member 82, 106 and 108, for example, may be cast, machined, additively manufactured and/or otherwise formed as a single, unitary body. By contrast, a non-monolithic body may include multiple discretely formed parts which are (e.g., removably) attached together following the formation thereof.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a turbine engine, comprising:

a carrier extending circumferentially around an axis, the carrier including a cavity, a first section and a second section, the first section including a first inner flange and a first section mount extending radially inward from the first inner flange, the second section including a second inner flange and a second section mount extending radially inward from the second inner flange, the cavity formed within the carrier by the first section and the second section, the first section attached to the second section at a full-hoop inner seal interface located radially inboard of the cavity, the first section axially overlapping the second section at the full-hoop inner seal interface, and the first section further attached to the second section at a full-hoop outer seal interface located radially outboard of the cavity;

a control ring extending circumferentially around the axis within the cavity; and a blade outer air seal mounted to the carrier via the first section mount and the second section mount;

wherein the full-hoop inner seal interface comprises a lap joint between the first inner flange of the first section and the second inner flange of the second section, the lap joint is located axially between the first section mount and the second section mount, the first inner flange is attached to the second section at the full-hoop inner seal interface, and the second inner flange is attached to the first inner flange at the full-hoop inner seal interface.

2. The assembly of claim 1, wherein the carrier fluidly separates the cavity from a plenum next to and/or around the carrier.

3. The assembly of claim 1, wherein the full-hoop inner seal interface comprises an interference fit connection between the first section and the second section.

4. The assembly of claim 1, wherein the second section axially overlaps the first section at the full-hoop outer seal interface.

5. The assembly of claim 1, wherein the full-hoop outer seal interface comprises an interference fit connection between the first section and the second section.

6. The assembly of claim 1, wherein the first section and the second section each have a channeled sectional geometry.

7. The assembly of claim 1, wherein the first section includes a first outer flange and a first web extending radially between and connected to the first inner flange and the first outer flange, and the first outer flange is attached to the second section at the full-hoop outer seal interface; and the cavity extends axially within the carrier to the first web, and the cavity extends radially within the carrier from the first inner flange to the first outer flange.

8. The assembly of claim 7, wherein the second section includes a second outer flange and a second web extending radially between and connected to the second inner flange and the second outer flange, and the second outer flange is attached to the first outer flange at the full-hoop outer seal interface; and the cavity extends axially within the carrier from the second web to the first web.

9. The assembly of claim 8, wherein the cavity further extends radially within the carrier from the second inner flange to the first outer flange.

10. The assembly of claim 8, wherein an axial distal end of the first outer flange is axially adjacent the second web.

11. The assembly of claim 8, wherein the second outer flange is radially outboard of and axially overlaps the first outer flange at an axial distal end of the first outer flange.

12. The assembly of claim 1, wherein the blade outer air seal is mounted to the first section.

13. The assembly of claim 12, wherein the blade outer air seal is further mounted to the second section.

14. The assembly of claim 1, wherein the blade outer air seal is mounted to the second section.

15. The assembly of claim 1, wherein the first section and the second section each have a full-hoop monolithic body.

16. The assembly of claim 1, wherein the first inner flange projects axially from a first flange base to a first flange distal end; and the second inner flange projects axially from a second flange base to a second flange distal end.

17. An assembly for a turbine engine, comprising:

a carrier extending circumferentially around an axis, the carrier including a cavity, a first section and a second section, the cavity formed within the carrier by the first section and the second section, the first section including a first flange rim projecting axially from a first flange base to a first flange distal end and a first section mount extending radially inward from the first flange base, the second section including a second flange rim projecting axially from a second flange base to a second flange distal end and a second section mount extending radially inward from the second flange base, the first flange rim coupled to the second flange rim at an axial lap joint located radially inboard of the cavity, the lap joint located axially between the first section mount and the second section mount, the axial lap joint extending uninterrupted circumferentially around the axis, and the first section further coupled to the second section at an outer joint located radially outboard of the cavity;

a control ring extending circumferentially around the axis within the cavity; and a blade outer air seal mounted to the carrier via the first section mount and the second section mount.

18. The assembly of claim 17, wherein the outer joint extends uninterrupted circumferentially around the axis.

19. The assembly of claim 17, wherein the blade outer air seal is mounted to each of the first section and the second section.

* * * * *